United States Patent [19]
Yamamoto et al.

[11] Patent Number: 5,653,314
[45] Date of Patent: Aug. 5, 1997

[54] RODLESS CYLINDER WITH POSITION DETECTOR AND BRAKE

[75] Inventors: Hitoshi Yamamoto; Kenji Fukushima; Hiroyuki Shimono; Nobuhiro Fujiwara, all of Yawara-mura, Japan

[73] Assignee: SMC Corporation, Tokyo, Japan

[21] Appl. No.: 510,323

[22] Filed: Aug. 2, 1995

[30] Foreign Application Priority Data

Dec. 26, 1994 [JP] Japan .................. 6-336716

[51] Int. Cl.$^6$ .................. F16C 29/02; F16D 63/00; B65H 59/10
[52] U.S. Cl. .................. 188/67; 92/88
[58] Field of Search .................. 188/67, 170, 43; 92/88, 15, 18, 23, 27

[56] References Cited

U.S. PATENT DOCUMENTS

| | | | |
|---|---|---|---|
| 4,856,415 | 8/1989 | Noda | 92/88 |
| 4,926,982 | 5/1990 | Granbom | 92/88 |
| 5,275,008 | 1/1994 | Takada et al. | 92/88 |
| 5,277,101 | 1/1994 | Matsuki et al. | 92/88 |
| 5,469,940 | 11/1995 | Yamamoto et al. | 188/67 |

FOREIGN PATENT DOCUMENTS 5-61504  8/1993  Japan .

*Primary Examiner*—Matthew C. Graham
*Attorney, Agent, or Firm*—Brumbaugh, Graves, Donohue & Raymond

[57] ABSTRACT

A rodless cylinder with a position detector and a brake has a sliding table which is slidably retained on a cylinder tube. A moving member (piston yoke) of the rodless cylinder is secured to the sliding table. A brake unit part is connected to one side of the sliding table, and a sensor part is connected to the other side of the sliding table. A brake plate is disposed to extend through the brake unit part. Both ends of the brake plate are connected to a first and second head covers, respectively, which are provided at both ends of the cylinder tube. A first and second brake shoes are disposed to sandwich the brake plate therebetween. The first brake shoe is subjected to brake spring force. A passage for supplying a pressure fluid is communicated with the other side of the sliding table. Thus, the brake is actuated by allowing the brake spring force, together with a fluid pressure if necessary, to act on the first brake shoe, and the brake is released by the action of a fluid pressure.

9 Claims, 7 Drawing Sheets

A-A

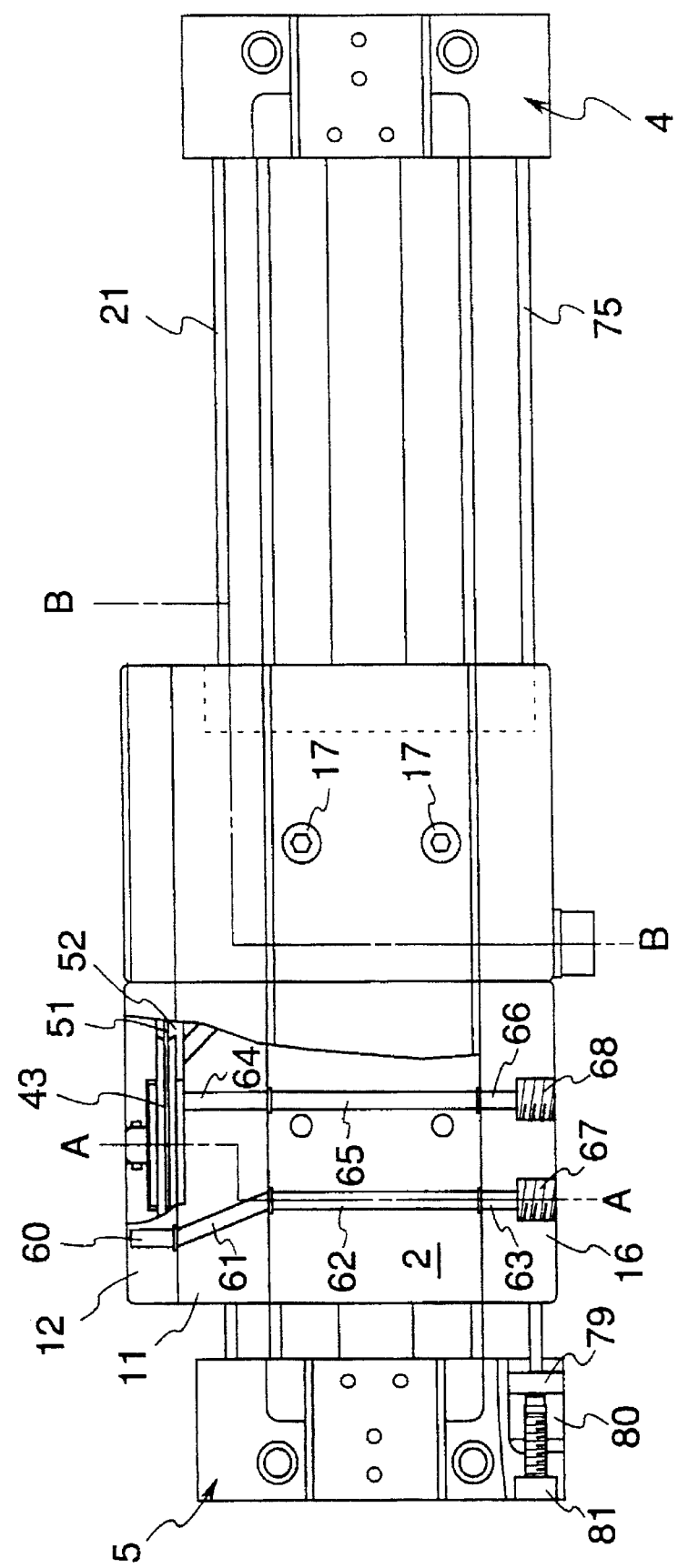

A-A

B-B

C-C

SEEN FROM ARROW D

RODLESS CYLINDER WITH POSITION DETECTOR AND BRAKE

BACKGROUND OF THE INVENTION

1. Field of the Invention

The present invention relates to a rodless cylinder which is used to actuate an operating member or the like of various machines, and which can be equipped with a brake unit for stopping a sliding table, and a position detector for detecting the position of the sliding table.

2. Description of the Related Art

The present applicant has filed a utility model registration application (see Japanese Utility Model Unexamined Publication (KOKAI) No. 5-61504) regarding a rodless cylinder with a brake. The rodless cylinder has a sliding table which is slidably retained on a cylinder tube (track base), and a brake plate which is disposed to extend through the sliding table. Both ends of the brake plate are secured to both end portions, respectively, of the track base. A brake device which is adapted to grip the brake plate is provided in the sliding table. That is, brake shoes which grip the brake plate therebetween, together with an actuating part that actuates the brake shoes by supplying and discharging a pressure fluid, are attached to the sliding table. In addition, the cylinder tube is provided with an axial passage, and a tube for supplying and discharging a pressure fluid is disposed in the passage along the axis of the cylinder body. One end of the tube is connected to a slider, and the other end of the tube is attached to an air supply piston which closely slides through the passage.

The above-described conventional rodless cylinder suffers, however, from some problems. That is, the brake device, which is adapted to grip the brake plate, is provided in the sliding table, and a workpiece or operating member of various machines is attached to the sliding table. Accordingly, when maintenance or repair of the brake device is to be made, it is necessary to detach the workpiece or operating member from the sliding table and further detach the table or other associated member from the sliding table. Thus, it takes a great deal of labor and time to detach the operating member and the like from the sliding table.

SUMMARY OF THE INVENTION

An object of the present invention is to provide a rodless cylinder with a position detector and a brake, which is designed so that maintenance or repair of the brake unit part can be made without the need of detaching a workpiece or operating member from the sliding table.

To attain the above-described object, the present invention provides a rodless cylinder with a position detector and a brake. The rodless cylinder includes a sliding table which is slidably retained on a cylinder tube directly or through a piston yoke. A moving member (piston yoke) of the rodless cylinder is secured to the sliding table. A brake unit part is connected to one side of the sliding table, and a sensor part (which may include only a sensor body, exclusive of a sensor unit) is connected to the other side of the sliding table. A brake plate is disposed to extend through the brake unit part. Both ends of the brake plate are connected to a first and second head covers, respectively, which are provided at both ends of the cylinder tube. A first and second brake shoes are disposed to sandwich the brake plate therebetween. The first brake shoe is subjected to brake spring force. A passage for supplying a pressure fluid is communicated with the other side of the sliding table. Thus, the brake is actuated by allowing the brake spring force, together with a fluid pressure if necessary, to act on the first brake shoe, and the brake is released by the action of a fluid pressure.

The rodless cylinder may be arranged as follows: A scale plate is disposed to extend through the sensor part. The scale plate is connected at both ends thereof to the first and second head covers, respectively. The scale plate is formed with a magnetic scale. Further, a detecting head is disposed at a position where it can read the magnetic scale of the scale plate, thereby making it possible to detect the position of the sliding table.

The brake unit part may be arranged as follows: a diaphragm is clamped between a brake body and a side cover having a bore formed in the center thereof, and a brake holder is secured to the central portion of the diaphragm. The brake holder has the first brake shoe secured to the inner end thereof, and further has an engagement projection which is formed with an internal thread. The engagement projection is slidably fitted in the center bore of the side cover, so that the brake is released by thread-engaging a bolt with the internal thread of the brake holder from the outside of the side cover.

Further, the rodless cylinder may be arranged as follows: The scale plate is disposed to extend through a sensor guide having a U-shaped cross-sectional configuration. The upper portion of a sensor holder made from a thin elastic plate is secured in a recess formed in the sensor part, and the lower portion of the sensor holder is clamped between the sensor guide and the detecting head such that a detecting surface of the detecting head faces the magnetic scale of the scale plate. A sensor output connector is disposed on a side surface of the sensor part so that the output of the detecting head is passed through an amplifier and transmitted to the outside through the sensor output connector.

Further, the rodless cylinder may be arranged as follows: A port for supplying a pressure fluid to the brake unit part is provided in a side surface of the sensor part. A pair of cylinder actuating ports are provided in a side surface of each of the first and second head covers which is on the same side as the side surface of the sensor part. Further, a pair of cylinder actuating ports are provided in the front end surface of the first head cover, and another pair of cylinder actuating ports are provided in the rear end surface of the second head cover. One of the pairs of cylinder actuating ports are maintained in an open state, while the other cylinder actuating ports are closed with respective lid members. Thus, the rodless cylinder is actuated by a pressure fluid which is supplied from one of the pairs of cylinder actuating ports.

By virtue of the above-described arrangement, the rodless cylinder is actuated by the pressure fluid which is supplied from one of the pairs of cylinder actuating ports, causing the sliding table to slide on the cylinder tube. When brake spring force, together with a fluid pressure if necessary, acts on the first brake shoe, the brake is actuated. That is, the brake plate is gripped between the first and second brake shoes, and thus the sliding table is stopped. When the brake is released by the action of a fluid pressure, the brake plate is released from the gripping by the first and second brake shoes, thereby allowing the sliding table to move. The position of the sliding table is detected by the detecting head, which is disposed at a position where it can read the magnetic scale of the scale plate.

BRIEF DESCRIPTION OF THE DRAWINGS

FIG. 2 is a partly-sectioned plan view of the rodless cylinder according to the first embodiment of the present invention.

Pig. 7(a) is a vertically-sectioned front view of a rodless cylinder with a brake according to a second embodiment of the present invention.

Figure 7A:
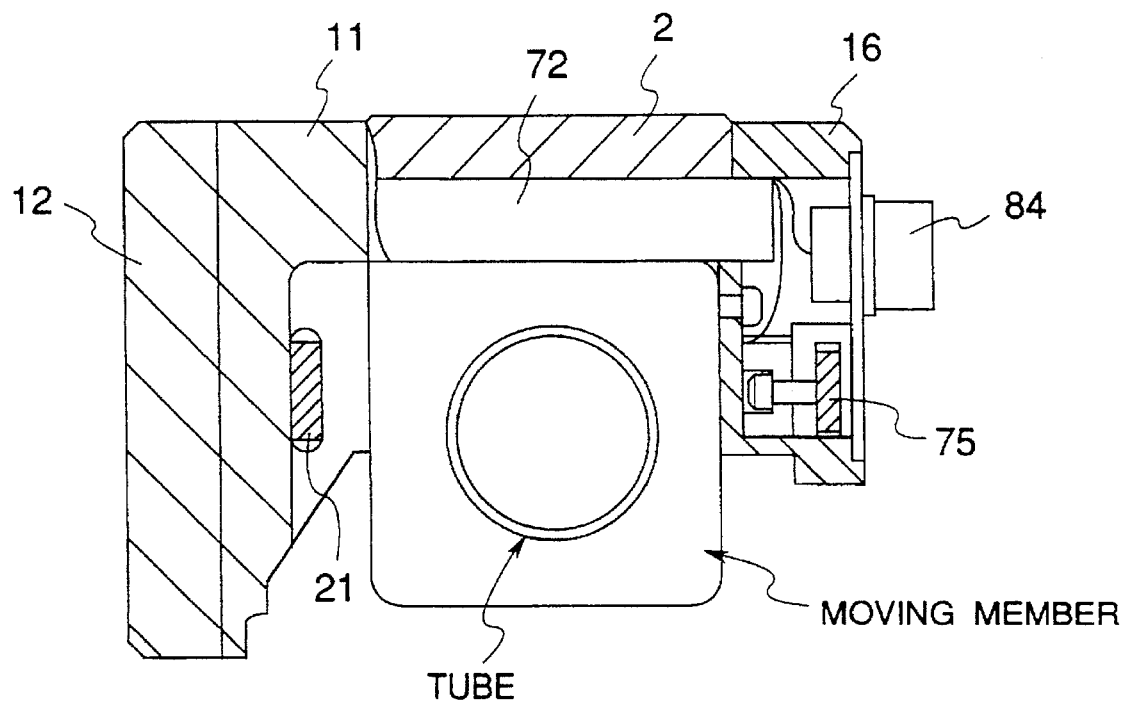
Figure 7B:
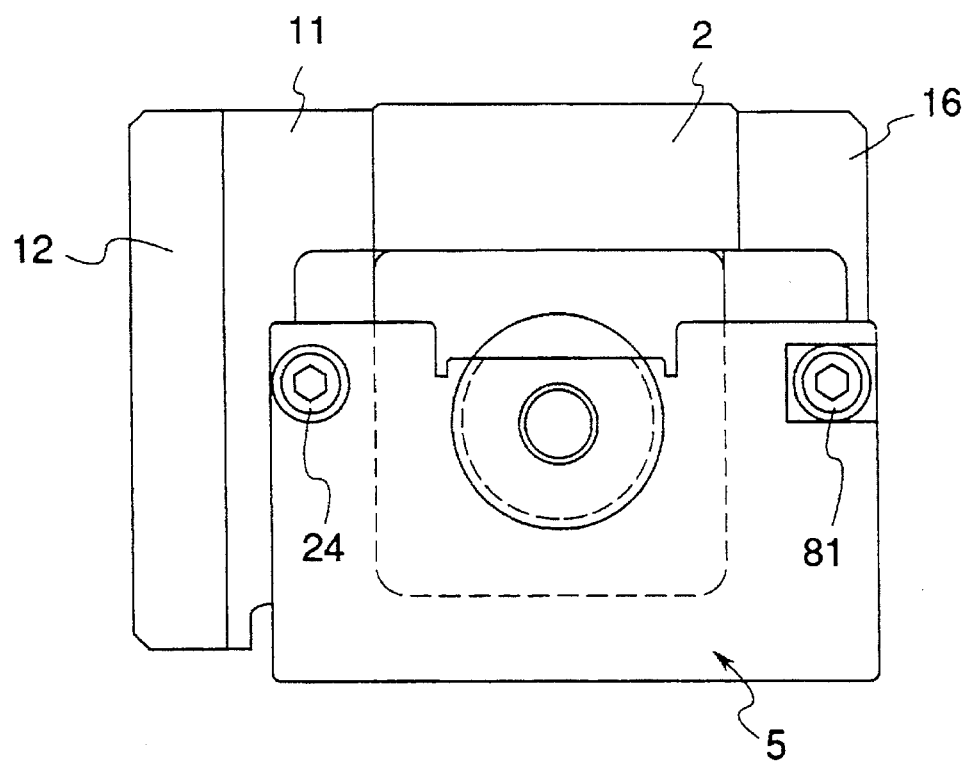

FIG. 7(b) is a front view of the rodless cylinder according to the second embodiment of the present invention.

DESCRIPTION OF THE PREFERRED EMBODIMENTS

Figure 1:
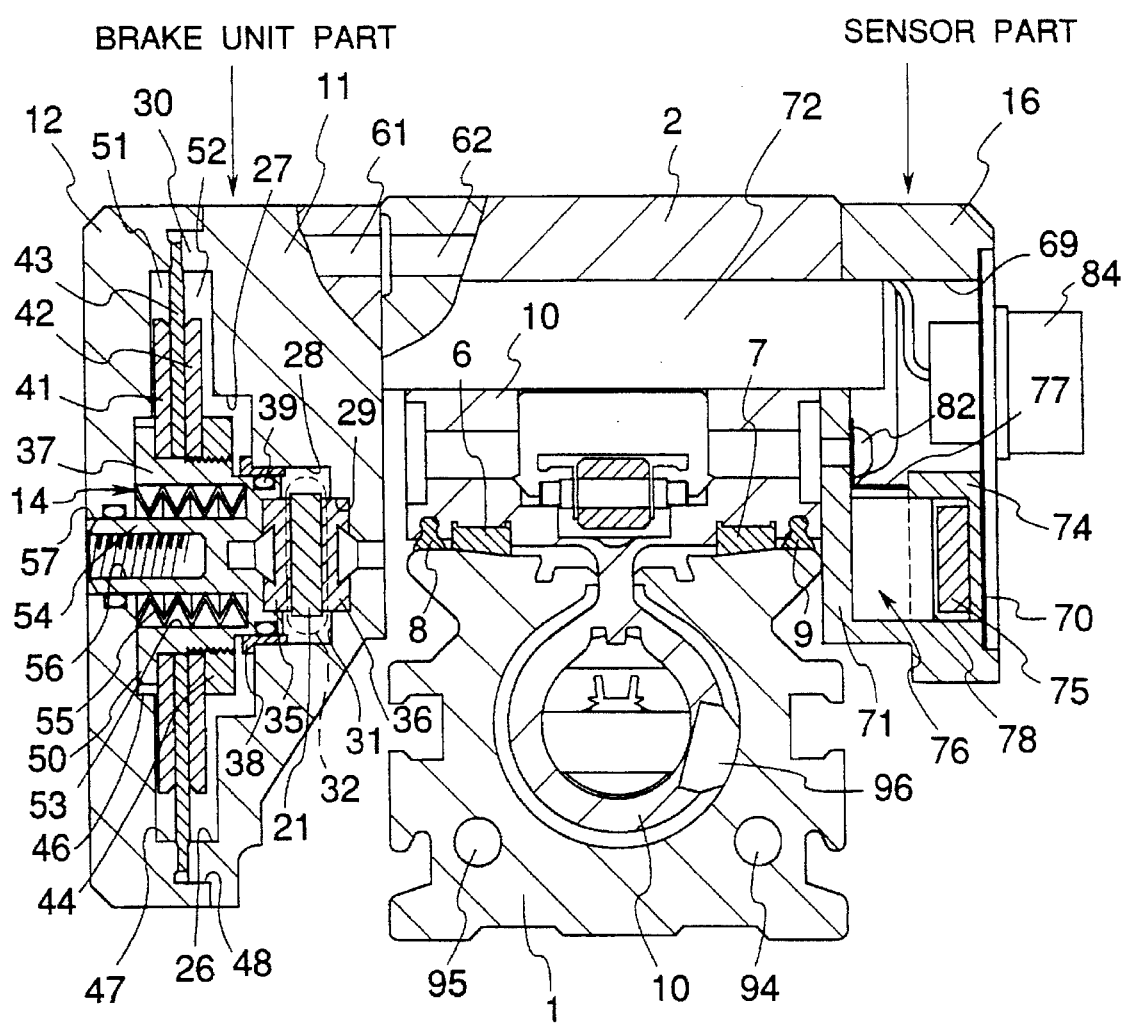
FIG. 1 is a vertically-sectioned front view of a rodless cylinder with a brake according to a first embodiment of the present invention.
Figure 3A:
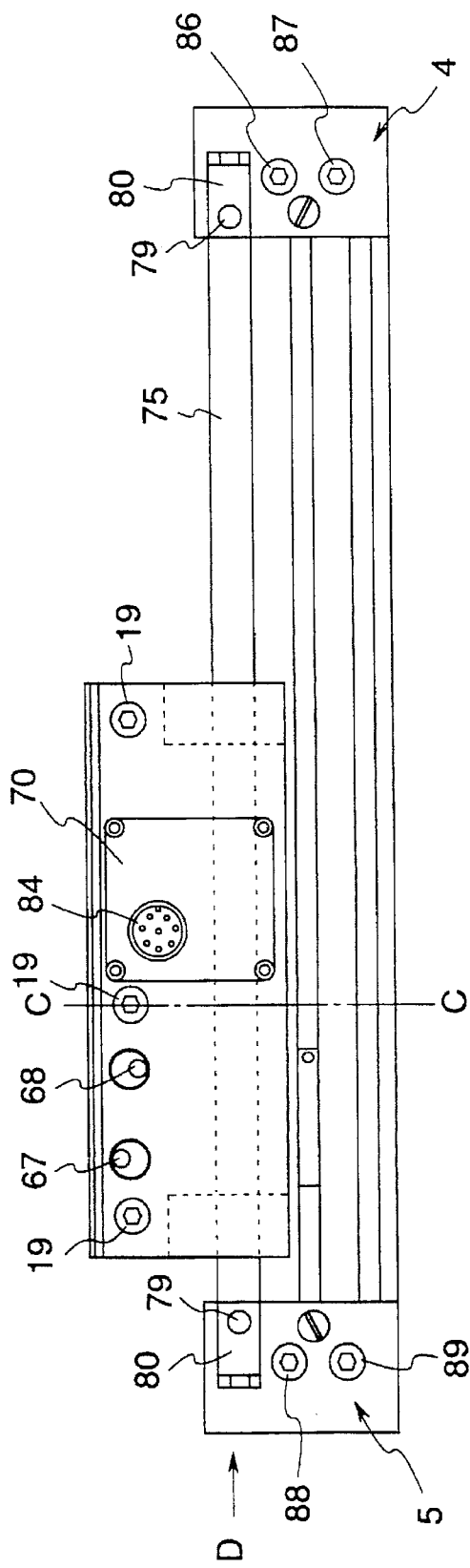
FIG. 3(a) is a side view of the rodless cylinder according to the first embodiment of the present invention as viewed from the right-hand side thereof.
Figure 3B:
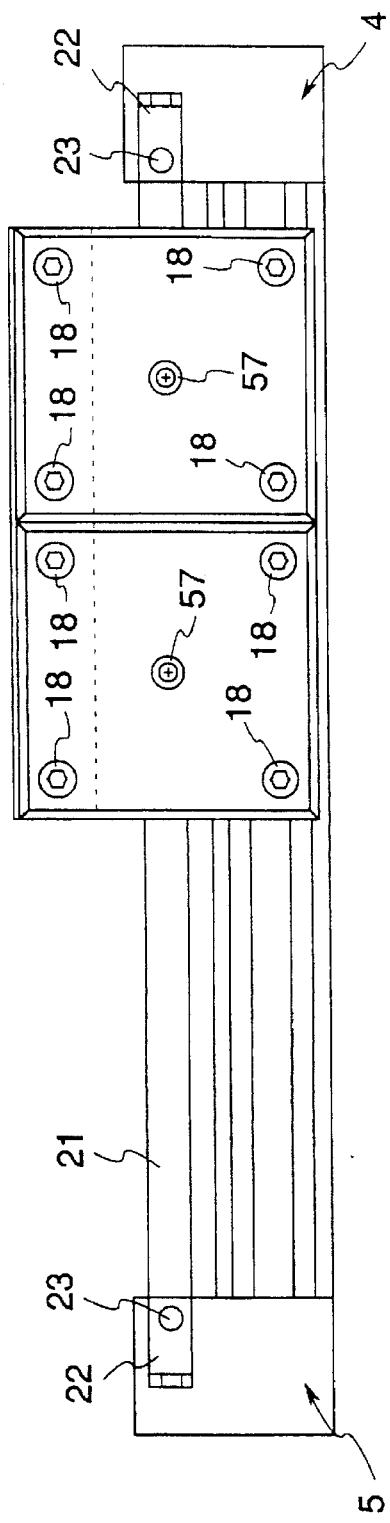
FIG. 3(b) is a side view of the rodless cylinder according to the first embodiment of the present invention as viewed from the left-hand side thereof.

A rodless cylinder with a brake according to a first embodiment of the present invention will be described below with reference to FIGS. 1 to 6. It should be noted that FIG. 1 is a vertically-sectioned front view of a rodless cylinder with a brake according to the first embodiment, which is properly sectioned in FIG. 2 in order to clearly show essential parts thereof.

Figure 5:
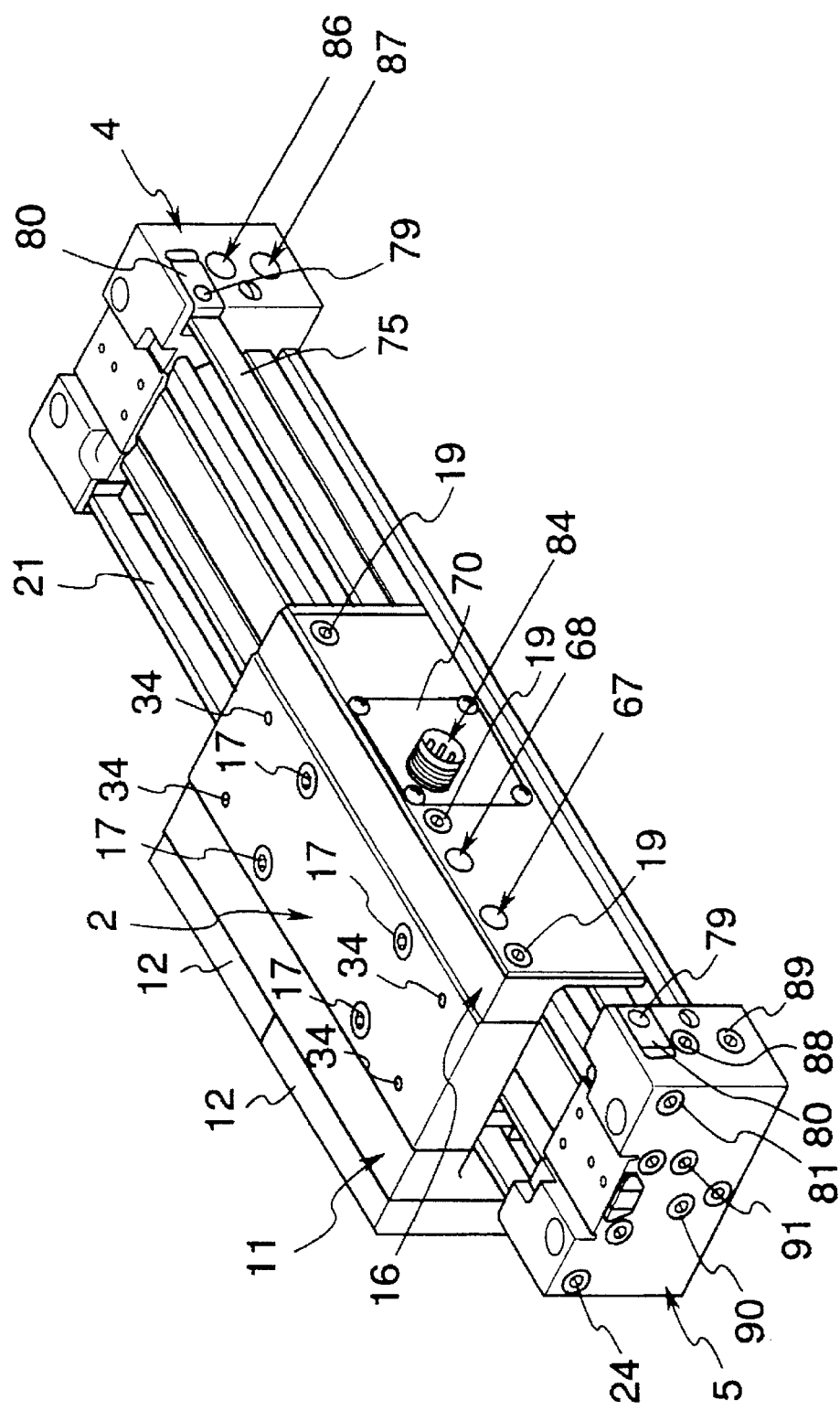
FIG. 5 is a perspective view of the rodless cylinder shown in FIG. 2, as viewed from the right-hand side thereof.
Figure 6:
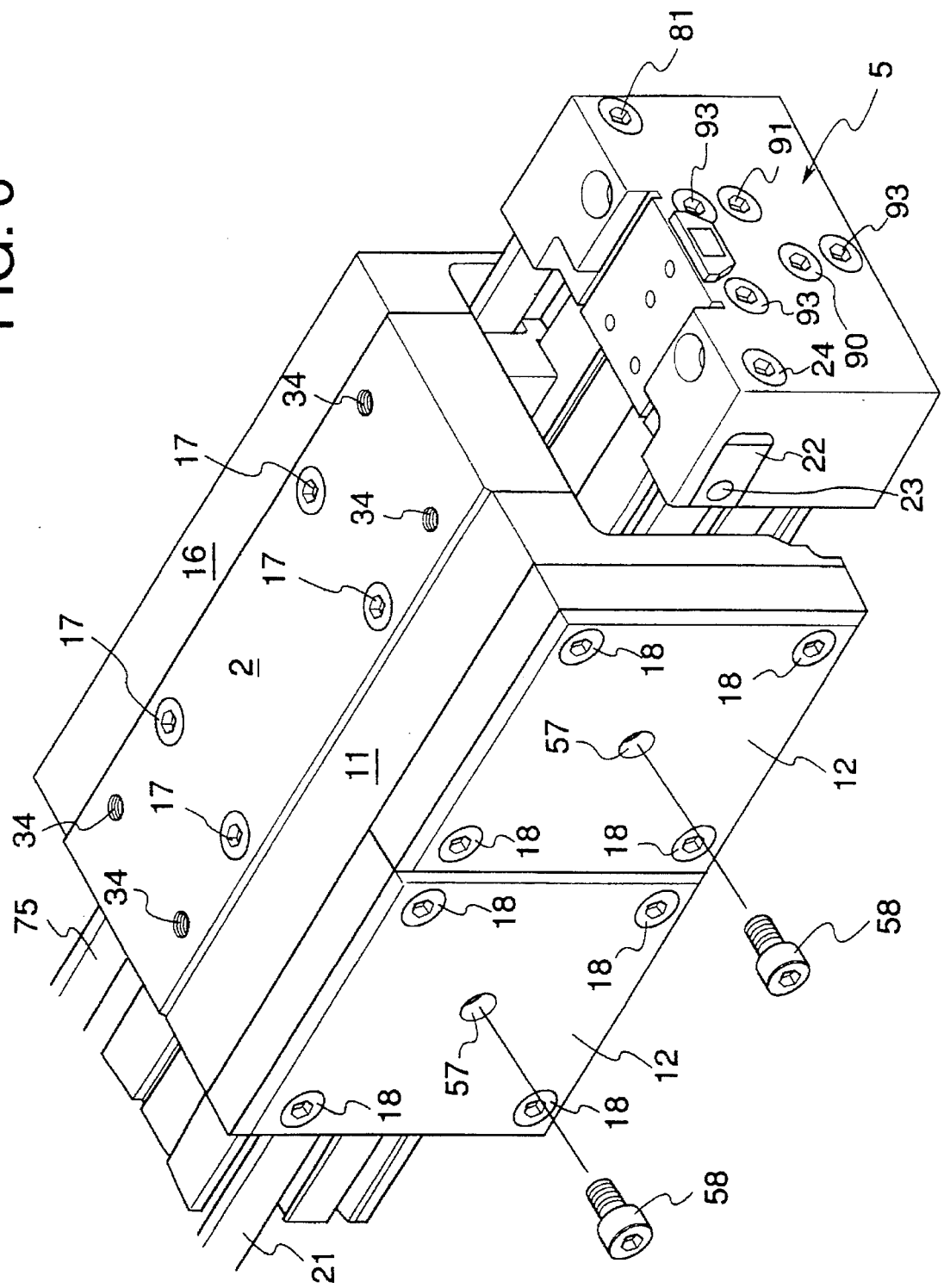
FIG. 6 is a perspective view of the rodless cylinder shown in FIG. 2, as viewed from the left-hand side thereof.

The rodless cylinder has a cylinder tube (track base) 1. A first head cover 4 and a second head cover 5 are connected to both ends, respectively, of the cylinder tube 1. An upper block of a piston yoke (moving member) 10 is slidably supported through sliding members 6 and 7 and side seals 8 and 9 on the cylinder tube 1. The sliding members 6 and 7 are made of a synthetic resin material. The side seals 8 and 9 serve as dust guards. The sliding members 6 and 7 and the side seals 8 and 9 are secured in respective elongate recesses which are formed in the lower surface of the upper block of the piston yoke 10. As shown in FIG. 1, the upper surface of the cylinder tube 1 is sloped such that both ends thereof are higher than the center as viewed in a section perpendicular to the axis of the cylinder tube 1, thereby enabling the piston yoke 10 to be put in a predetermined position with respect to the cylinder tube 1. As is clearly shown in FIGS. 1, 5 and 6, a sliding table 2 is mounted on the upper side of the piston yoke 10. The sliding table 2 and the piston yoke 10 are connected together by using four bolts 17. The lower part of the piston yoke 10 is disposed in a columnar passage in the cylinder tube 1, and thus the sliding table 2 is moved by the piston yoke 10. A brake unit part is disposed to abut on one side (the left-hand side as viewed in FIG. 1) of the sliding table 2, and a sensor body 16 is disposed to abut on the other side (the right-hand side as viewed in FIG. 1) of the sliding table 2. The brake unit part and the sensor body 16 are connected to each other by using three bolts 19 (see FIGS. 4(c) and 5). As shown in FIGS. 5 and 6, the upper surface of the sliding table 2 is a work mount surface, which is formed with four tapped holes 34 for connecting a workpiece to the surface.

Next, the brake unit part will be explained. In the brake unit part, a single brake body 11 is disposed to abut on one side of the sliding table 2, and two side covers 12, which lie adjacent to each other, are disposed to abut on the outer side of the brake body 11. The brake body 11 and the side covers 12 are connected together by using eight bolts 18. Two brake units 14 which have the same structure are disposed in the brake unit part, which comprises the brake body 11 and the two side covers 12. Referring to FIG. 1, which shows one brake unit 14, three concentrical disc-shaped recesses 26 to 28 are contiguously formed in the brake body 11 so as to reduce in diameter stepwisely from the outside toward the inside. An annular projection 30 is formed radially outside of the recess 26. A recess 29 for fitting a brake shoe is formed at the inside (the right-hand side as viewed in FIG. 1) of the recess 28. A space that is defined in the recess 28 serves as a brake chamber 31. A brake receiving hole 32 (shown by the dotted line in FIG. 1) opens into the brake chamber 31. The brake receiving hole 32 has a flat circular cross-sectional configuration, and extends in the axial direction. A single brake plate 21 is disposed to extend through the two brake units 14. Both ends of the brake plate 21 are connected to the first and second head covers 4 and 5, respectively. More specifically, a connecting member 22 is inserted into a recess formed in one side (the left-hand side as viewed in FIG. 6) of each of the first and second head covers 4 and 5, and each end portion of the brake plate 21 is connected to the connecting member 22 by a pin 23. Further, a bolt 24 is thread-engaged with the connecting member 22, thereby connecting the two ends of the brake plate 21 to the first and second head covers 4 and 5.

In the brake chamber 31, a first brake shoe 35 and a second brake shoe 36 are disposed at both sides, respectively, of the brake plate 21. The first brake shoe 35 is fitted in a recess formed in the inner end of a brake holder 37, and connected thereto by a bolt. The second brake shoe 36 is fitted in the recess 29 of the brake body 11, and connected thereto by a bolt. The brake holder 37 has a small-diameter portion, a large-diameter portion and a flange 50 on the outer periphery thereof. An annular seal 39 is fitted in an annular groove formed in the small-diameter portion of the brake holder 37. An external thread is formed on a half of the large-diameter portion which is closer to the small-diameter portion. An annular brake guide 38, which has a U-shaped cross-sectional configuration, is secured to the step defined between the recesses 27 and 28 of the brake body 11. The small-diameter portion of the brake holder 37 is slidably fitted to the inner peripheral surface of the brake guide 38. The annular seal 39 prevents leakage of air through the area of sliding fit between the inner peripheral surface of the brake guide 38 and the small-diameter portion of the brake holder 37. An approximately annular first diaphragm shell 41, diaphragm 43 and second diaphragm shell 42 are fitted on the large-diameter portion of the brake holder 37 in the mentioned order from the outside toward the inside, and clamped between the flange 50 and a diaphragm nut 44 by thread engagement between the nut 44 and the external thread formed on the large-diameter portion of the brake holder 37.

Three concentrical disc-shaped recesses 46 to 48 are contiguously formed in the inner surface of each side cover 12 so as to increase in diameter stepwisely from the center of the side cover 12. An annular abutment is formed between the recesses 47 and 48. The outer peripheral portion of the diaphragm 43 is clamped between the annular projection 30 of the brake body 11 and an annular abutment of the side cover 12. The diaphragm 43 defines a brake actuating chamber 51 which comprises the recesses 46 and 47 and a brake release chamber 52 which comprises the recesses 26 and 27. An annular recess 53 is formed in the brake holder 37 at a position radially inward of the flange 50. A brake spring 55 is fitted in the annular recess 53. One end (the left-hand end as viewed in FIG. 1) of the brake spring 55 abuts on the inner surface of the side cover 12. An engagement projection 54 is formed radially inward of the annular recess 53. The engagement projection 54 has an internal thread 56 which is formed from one end thereof. The engagement projection 54 is slidably fitted into a center bore 57 formed in the side cover 12. The area of fit between the engagement projection 54 and the center bore 57 is sealed with an annular seal which is fitted in an annular recess formed in the inner peripheral surface of the center bore 57.

The brake unit 14 comprises the brake holder 37, the first brake shoe 35, the brake spring 55, etc., which are connected to the diaphragm 43, and the brake guide 38, and the second brake shoe 36. Thus, since the constituent elements other than the brake guide 38 and the second brake shoe 36 are connected to the diaphragm 43, replacement of the brake unit 14 is facilitated. Replacement, repair or inspection of the brake unit 14 can be made by removing the side cover 12 without the need of detaching a workpiece or the like from the sliding table 2, as a matter of course. When the brake is in an operative state by the action of the resilient force of the brake spring 55 and pneumatic pressure, one end of the engagement projection 54 lies at a position which is inward of the outer surface (the left end surface as viewed in FIG. 1) of the side cover 12. Accordingly, if a bolt 58 is thread-engaged with the internal thread 56 of the brake holder 37 through the center bore 57 from the outside of the side cover 12, the brake holder 37 moves outwardly against the resilient force of the brake spring 55 and the pneumatic pressure, thus enabling the brake to be released by a manual operation even if there is no pneumatic pressure for releasing.

Figure 4A:
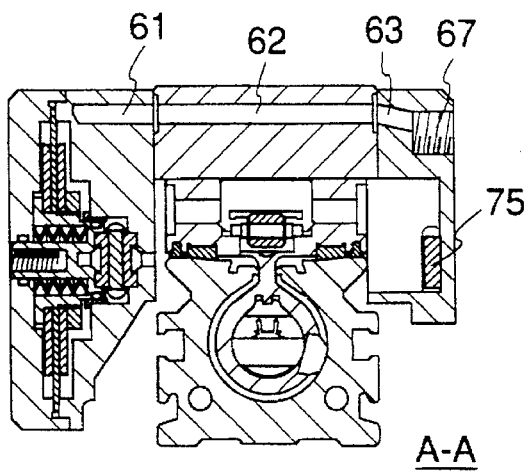
FIG. 4(a) is a sectional view taken along the line A—A in FIG. 2.
Figure 4B:
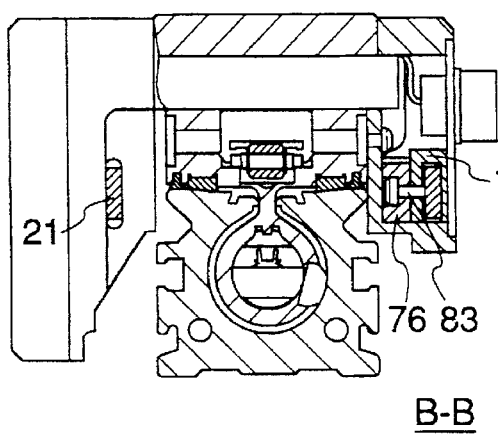
FIG. 4(b) is a sectional view taken along the line B—B in FIG. 2.
Figure 4C:
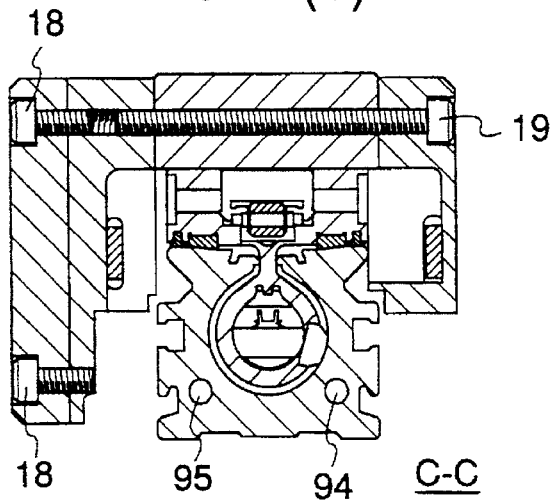
FIG. 4(c) is a sectional view taken along the line C—C in FIG. 3(a).
Figure 4D:
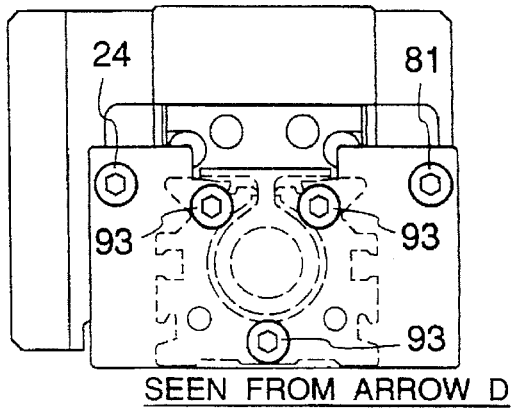
FIG. 4(d) is a view seen from the direction of the arrow D in FIG. 3(a).
Figure 4E:
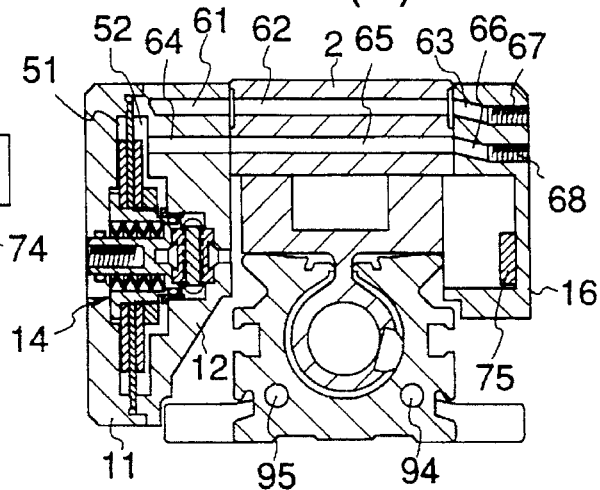
FIG. 4(e) is a sectional view showing a plurality of sections of the rodless cylinder according to the first embodiment of the present invention.

As will be understood from FIGS. 2 and 4(e), the brake actuating chamber 51 is communicated with a brake actuating port 67, which is provided in a side surface (the right side surface as viewed in FIG. 4(e)) of the sensor body 16, through a passage 60 in the side cover 12, a passage 61 in the brake body 11, a passage 62 in the sliding table 2, and a passage 63 in the sensor body 16. A joint between each pair of adjacent passages is sealed with an annular seal. Similarly, the brake release chamber 52 is communicated with a brake release port 68, which is provided in the side surface of the sensor body 16, through a passage 64 in the brake body 11, a passage 65 in the sliding table 2, and a passage 66 in the sensor body 16, and a joint between each pair of adjacent passages is sealed with an annular seal. The brake actuating port 67 and the brake release port 68 are each communicated with a pneumatic pressure source or the atmosphere through a tube, a directional control valve, etc. (which are not shown).

Air that is supplied to the brake actuating port 67 flows into the brake actuating chamber 51 to actuate the brake in cooperation with the resilient force of the brake spring 55. At this time, the second brake shoe 36 is fixed in the recess 29 of the brake body 11, while the first brake shoe 35 is fixed to the inner end of the brake holder 37, and the brake plate 21 is slightly deflected by the first and second brake shoes 35 and 36, thereby producing braking force. Air that is supplied to the brake release port 68 flows into the brake release chamber 52 to release the brake against the resilient force of the brake spring 55. It should be noted that, when the resilient force of the brake spring 55 is sufficiently strong, the brake can be actuated without supplying air into the brake actuating chamber 51. In such a case, the brake actuating chamber 51 and the air passages which are communicated with it are not needed. Further, since the brake unit 14 is disposed inside each side cover 12, there are a total of two brake units 14. Accordingly, there are two sets of constituent elements, each including the brake actuating chamber 51, the brake release chamber 52, etc. Thus, the passages 61 and 64 are branched off (although not shown) so that the two brake actuating chambers 51 are communicated with the brake actuating port 67, and the two brake release chambers 52 are communicated with the brake release port 68. Since two brake units 14 are used, each brake unit can be reduced in both size and thickness in comparison to a case where only one brake unit is used to obtain the same holding power. Further, since two compact and thin brake units 14 can be connected to one side of the sliding table 2, the rodless cylinder is also excellent in terms of design.

Next, the position detector will be explained. As shown in FIGS. 1 and 5, a sensor body 16 has a recess 69 which is formed at a position slightly closer to the rear end (the right-hand side as viewed in FIG. 5) than the center of the sensor body 16. The recess 69 has an approximately square cross-sectional configuration. A shallow recess with a predetermined width is formed at the periphery of the opening of the recess 69. A lid member 70 is disposed to abut on the bottom of the shallow recess to close the recess 69. The lid member 70 is secured by using four bolts. A through-hole is formed in the upper portion of a side wall 71 of the recess 69, and another through-hole is formed in the sliding table 2 so as to be contiguous with the through-hole of the side wall 71. An amplifier 72 is disposed to extend through the two through-holes.

A sensor guide 74 is placed on the lower surface of the recess 69 (see FIG. 4(b)). The sensor guide 74 has a U-shaped cross-sectional configuration and a predetermined length. A detecting head 76 is disposed to abut on the inner side (the left-hand side as viewed in the figure) of the sensor guide 74 with the lower portion of a sensor holder 77 held therebetween. The sensor guide 74 and the detecting head 76 are connected together by a bolt 83. A scale plate 75 extends through a groove formed in the sensor guide 74. Both ends of the scale plate 75 are connected to the first and second head covers 4 and 5, respectively. Each end portion of the scale plate 75 is connected to a connecting member 80 by a pin 79 (see FIG. 5). The connecting member 80 is inserted into a recess formed in the other end (the right-hand end as viewed in FIG. 6) of each of the first and second head covers 4 and 5, and a bolt 81 is thread-engaged with the connecting member 80. Thus, both ends of the scale plate 75 are connected to the first and second head covers 4 and 5, respectively.

The scale plate 75 is made of a magnetic material so as to have a parallelogram cross-sectional configuration. The scale plate 75 has linear recesses and projections which are formed on the inner side (the side closer to the detecting head 76) of the scale plate 75 by etching such that the recesses and projections are alternately disposed at predetermined intervals in the axial direction. The linear recesses and projections form a magnetic scale. The magnetic scale is read by the detecting head 76 having an MR element which is biased by a permanent magnet. As shown in FIG.

1, the distal end portion of the detecting head 76 is inserted into a vertical groove formed in the sensor guide 74, and a detecting surface 78 of the detecting head 76 is disposed to face the magnetic scale of the scale plate 75. The sensor holder 77 is formed from a thin metallic plate having elasticity. The upper portion of the sensor holder 77 is secured to the side wall 71 by a bolt 82. The central portion of the sensor holder 77 is directed horizontally. The sensor holder 77 is kept floating in the lateral direction and rigid in the axial direction. Therefore, the clearance between the magnetic scale of the scale plate 75 and the detecting surface of the detecting head 76 is determined only the size of the space inside the U-shaped cross-section of the sensor guide 74 and the thickness of the scale plate 75. Accordingly, the tolerance of the clearance is minimal, and thus the sensor output is stabilized. The output of the detecting head 76 is sent to the amplifier 72 through a cord. The electric signal output from the detecting head 76 is amplified and formed into a pulse in the amplifier 72, and an output from the amplifier 72 is transmitted to the outside through a connector 84 which is disposed on the lid member 70.

The sensor part is also unitized. That is, the sensor guide 74, the detecting head 76, and the sensor holder 77 are connected together to constitute a sensor unit. Accordingly, replacement of the sensor part is facilitated. Replacement, repair, inspection or maintenance of the sensor part can be made by removing the lid member 70 without the need of detaching a workpiece or the like from the sliding table 2, as a matter of course.

A pair of cylinder actuating A- and B-ports 86 and 87 are provided in a side surface of the first head cover 4 which is on the same side as the side surface of the sensor part on which the ports 67 and 68 are provided. Similarly, a pair of cylinder actuating A- and B-ports 88 and 89 are provided in a side surface of the second head cover 5 on the same side as the sensor part. Further, a pair of cylinder actuating A- and B-ports (not shown) are provided in the front end surface of the first head cover 4. Similarly, a pair of cylinder actuating A- and B-ports 90 and 91 are provided in the rear end surface of the second head cover 5. One of the pairs of cylinder actuating A- and B-ports are maintained in an open state, while the other cylinder actuating A- and B-ports are closed with respective lid members. The four cylinder actuating A-ports are communicated with each other through a passage 94 and other passages, and the four cylinder actuating B-ports are also communicated with each other through a passage 95 and other passages (see FIG. 1). When a pressure fluid is supplied to the rodless cylinder through any of the cylinder actuating A-ports, the piston yoke 10, together with the sliding table 2, moves rightwardly as viewed in FIG. 5. Conversely, when a pressure fluid is supplied to the rodless cylinder through any of the cylinder actuating B-ports, the piston yoke 10, together with the sliding table 2, moves leftwardly as viewed in FIG. 5. It should be noted that three bolts 93 which are shown on the rear end surface of the second head cover 5 in FIG. 6 are used to connect together the second head cover 5 and the cylinder tube 1, and that the first head cover 4 and the cylinder tube 1 are connected together by using similar bolts. It should also be noted that a magnet 96 is connected to the piston yoke 10 so as to cooperate with an automatic switch which is disposed on the cylinder tube 1, thereby enabling the position of the piston yoke 10 to be known. It should be noted that, when no position detecting function is needed, installation of the sensor unit, the output sensor connector 84, etc. is omitted, although the sensor body 16 is connected to the sliding table 2.

A rodless cylinder with a brake according to a second embodiment of the present invention will be described below with reference to FIGS. 7(a) and 7(b). The second embodiment of the present invention employs a magnet type rodless cylinder in which magnets are mounted inside a piston and inside a moving member. The second embodiment is the same as the first embodiment in the other respects. Therefore, in FIGS. 7(a) and 7(b), the same members as those in the first embodiment are denoted by the same reference numerals as those in the first embodiment, and description thereof is omitted. It should be noted that a cable type rodless cylinder, a chain type rodless cylinder, a tube type rodless cylinder, etc. may be used as a rodless cylinder according to the present invention.

As has been described above, according to the present invention, a sliding table is slidably retained on a cylinder tube, and a brake unit part is connected to one side of the sliding table. A brake plate is disposed to extend through the brake unit part, and both ends of the brake plate are connected to a first and second head covers, respectively, which are provided at both ends of the cylinder tube. The brake plate is put between a first and second brake shoes. The brake is actuated by allowing brake spring force, together with fluid pressure if necessary, to act on the first brake shoe, and the brake is released by the action of fluid pressure. Further, in the present invention, a sensor part is connected to the other side of the sliding table. A scale plate is disposed to extend through the sensor part, and both ends of the scale plate are connected to the first and second head covers, respectively, which are provided at both ends of the cylinder tube. The scale plate is formed with a magnetic scale, and a detecting head is disposed at a position where it can read the magnetic scale of the scale plate, thereby making it possible to detect the position of the sliding table. Accordingly, maintenance or repair of the brake unit part or the sensor part can be made without the need of detaching a workpiece or other operating member from the sliding table.

Further, in the present invention, the brake in the brake unit part and the sensor in the sensor part are each unitized. Accordingly, replacement of the brake or the sensor can be readily made in a short time.

In the present invention, ports (brake actuating and release ports) for supplying a pressure fluid to the brake and a sensor output connector are installed on a side surface of the sensor part, and a pair of cylinder actuating ports are provided in a side surface of each of the first and second head covers which is on the same side as the side surface of the sensor part on which the ports and the sensor output connector are installed. Thus, since the piping and the cord extend in the same direction, it is easy to handle the piping and other constituent elements during installation.

In the present invention, an engagement projection of a brake holder is slidably fitted in a center bore of a side cover, and the engagement projection of the brake holder is formed with an internal thread so that the brake is released by thread-engaging a bolt with the internal thread of the brake holder from the outside of the side cover. Thus, the brake can be released by thread engagement of a bolt without the aid of pneumatic pressure. Accordingly, it is possible to adjust the position of the cylinder with ease.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A rodless cylinder with a position detector and a brake, comprising:

a sliding table retained on a cylinder tube;

a moving member of said rodless cylinder which is secured to said sliding table;

a brake unit part connected to one side of said sliding table and including a brake body on a side of said brake unit part adjacent said sliding table and a side cover on a side of said brake unit part away from said sliding table, said brake body and side cover defining a brake chamber and said side cover being removably attached to said body so that said chamber may be opened by removing said cover and without removing said sliding table;

a sensor part connected to the other side of said sliding table;

a brake plate disposed to extend through said brake chamber of said brake unit part, said brake plate being connected at one end thereof to a first head cover and at the other end thereof to a second head cover, said head covers being provided at opposite ends of said cylinder tube;

a first and second brake shoes disposed in said brake chamber to sandwich said brake plate therebetween, said first brake shoe being subjected to a brake spring force; and a passage for supplying a pressure fluid to said brake chamber, said passage being communicated with said other side of said sliding table;

wherein the brake is actuated by allowing the brake spring force, together with a fluid pressure if necessary, to act on said first brake shoe, and the brake is released by the action of a fluid pressure.

2. A rodless cylinder according to claim 1, further comprising:

a scale plate which is disposed to extend through said sensor part, said scale plate being connected at both ends thereof to said first and second head covers, respectively, and said scale plate being formed with a magnetic scale; and a detecting head disposed at a position where it can read the magnetic scale of said scale plate, thereby making it possible to detect a position of said sliding table.

3. A rodless cylinder according to claim 2, wherein said side cover has a bore formed in a center thereof; and said brake unit part includes a diaphragm which is clamped between said brake body and said side cover; and a brake holder secured to a central portion of said diaphragm, said brake holder having said first brake shoe secured to an inner end thereof, and said brake holder having an engagement projection which is formed with an internal thread, said engagement projection being slidably fitted in said center bore of said side cover, so that the brake is released by thread-engaging a bolt with the internal thread of said brake holder from an outside of said side cover.

4. A rodless cylinder according to claim 3, further comprising:

a sensor guide having a U-shaped cross-sectional configuration, said scale plate being disposed to extend through said sensor guide;

a sensor holder made from a thin elastic plate, said sensor holder having an upper portion thereof secured in a recess formed in said sensor part, and said sensor holder having a lower portion thereof clamped between said sensor guide and said detecting head such that a detecting surface of said detecting head faces the magnetic scale of said scale plate;

a sensor output connector disposed on a side surface of said sensor part so that an output of said detecting head is passed through an amplifier and transmitted to an outside through said sensor output connector.

5. A rodless cylinder according to claim 3, further comprising:

a port for supplying a pressure fluid to said brake unit part, said port being provided in a side surface of said sensor part;

a pair of cylinder actuating ports provided in a side surface of each of said first and second head covers which is on the same side as said side surface of said sensor part;

a pair of cylinder actuating ports provided in a front end surface of said first head cover; and a pair of cylinder actuating ports provided in a rear end surface of said second head cover;

wherein one of said pairs of cylinder actuating ports are maintained in an open state, while the other cylinder actuating ports are closed with respective lid members, and wherein said rodless cylinder is actuated by a pressure fluid which is supplied from one of said pairs of cylinder actuating ports.

6. A rodless cylinder according to claim 2, further comprising:

a sensor guide having a U-shaped cross-sectional configuration, said scale plate being disposed to extend through said sensor guide;

a sensor holder made from a thin elastic plate, said sensor holder having an upper portion thereof secured in a recess formed in said sensor part, and said sensor holder having a lower portion thereof clamped between said sensor guide and said detecting head such that a detecting surface of said detecting head faces the magnetic scale of said scale plate;

a sensor output connector disposed on a side surface of said sensor part so that an output of said detecting head is passed through an amplifier and transmitted to an outside through said sensor output connector.

7. A rodless cylinder according to claim 1, wherein said side cover has a bore formed in a center thereof; and said brake unit part includes a diaphragm which is clamped between said brake body and said side cover; and a brake holder secured to a central portion of said diaphragm, said brake holder having said first brake shoe secured to an inner end thereof, and said brake holder having an engagement projection which is formed with an internal thread, said engagement projection being slidably fitted in said center bore of said side cover, so that the brake is released by thread-engaging a bolt with the internal thread of said brake holder from an outside of said side cover.

8. A rodless cylinder according to claim 7, further comprising:

a port for supplying a pressure fluid to said brake unit part, said port being provided in a side surface of said sensor part;

a pair of cylinder actuating ports provided in a side surface of each of said first and second head covers which is on the same side as said side surface of said sensor part;

a pair of cylinder actuating ports provided in a front end surface of said first head cover; and a pair of cylinder actuating ports provided in a rear end surface of said second head cover;

wherein one of said pairs of cylinder actuating ports are maintained in an open state, while the other cylinder actuating ports are closed with respective lid members, and wherein said rodless cylinder is actuated by a pressure fluid which is supplied from one of said pairs of cylinder actuating ports.

9. A rodless cylinder according to claim 7, further comprising:

a sensor guide having a U-shaped cross-sectional configuration, said scale plate being disposed to extend through said sensor guide;

a sensor holder made from a thin elastic plate, said sensor holder having an upper portion thereof secured in a recess formed in said sensor part, and said sensor holder having a lower portion thereof clamped between said sensor guide and said detecting head such that a detecting surface of said detecting head faces the magnetic scale of said scale plate;

a sensor output connector disposed on a side surface of said sensor part so that an output of said detecting head is passed through an amplifier and transmitted to an outside through said sensor output connector.

* * * * *